Nov. 21, 1950  H. R. BRUET ET AL  2,531,198
DEVICE FOR IMMOBILIZING A PIECE WITH
RESPECT TO ANOTHER ONE IN AT LEAST
ONE PREDETERMINED POSITION

Filed Dec. 9, 1947  2 Sheets-Sheet 1

INVENTOR
Henri René Bruet
Theodore Lafitte
BY
Lucke & Lucke
AGENTS

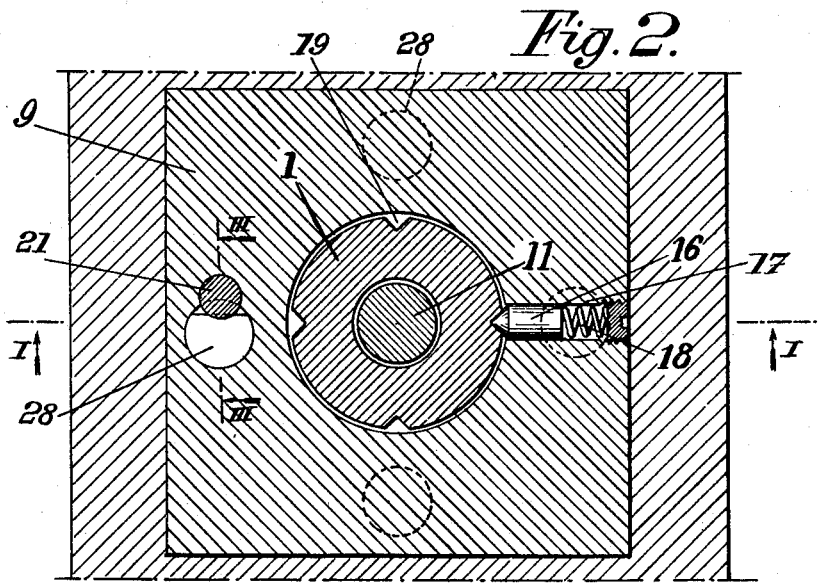
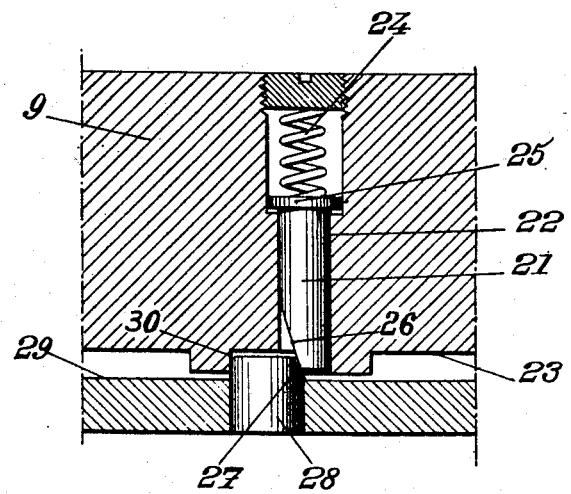

Patented Nov. 21, 1950

2,531,198

UNITED STATES PATENT OFFICE 2,531,198

DEVICE FOR IMMOBILIZING A PIECE WITH RESPECT TO ANOTHER ONE IN AT LEAST ONE PREDETERMINED POSITION

Henri René Bruet, Neuilly-sur-Seine, and Theodore Lafitte, Paris, France

Application December 9, 1947, Serial No. 790,672
In France December 11, 1946

2 Claims. (Cl. 29—49)

The present invention relates to devices for immobilizing a piece with respect to another one in at least one predetermined position by movement of these pieces toward each other, and it is more especially, although not exclusively, concerned, among these devices, with rotary turrets carrying several tools or pieces of work intended to undergo successive and different machining operations, in machine-tools such as slide lathes, turret lathes, multiple spindle lathes, milling machines, slotting machines, and the like.

The chief object of our invention is to provide a device of this kind such that the determination of the position of a piece with respect to another one, during the operation necessary to its immobilization, can take place in an automatic and very accurate manner, so that said piece can occupy always the same relative position, after each of its displacements.

An essential feature of our invention consists in housing in one of the pieces to be immobilized with respect to another one, a finger urged through elastic means toward this other piece in such manner that it can project from the surface of the first piece, in providing the free end of this finger with a plane face oblique to the axis of said finger, and in providing on the other piece at least one projection having an oblique plane face suitably positioned to constitute a support along which the oblique plane face of the elastic finger can slide to ensure the correct positioning of the first piece with respect to the other when they are moved toward each other.

According to another feature of our invention, when one of the pieces is to occupy at least one given angular position about the axis along which is exerted the effort for bringing said pieces toward each other, for instance in the case of a machine-tool rotary turret, we provide the angularly movable piece with at least two conical bearing surfaces located at a distance from each other and having preferably the same apex angle and the same apex while their axis coincides with that about which said piece rotates, said conical surfaces being adapted, under the effect of the movement of the pieces in question toward each other for their immobilization, to come into contact with analogous conical surfaces provided on the other piece.

A preferred embodiment of our invention will be hereinafter described with reference to the accompanying drawings, given merely by way of example, and in which:

Figs. 1 and 2 show, respectively in axial section on the line I—I of Fig. 2 and in transverse section on the line II—II of Fig. 1, a machine-tool turret made according to our invention.

Figs. 3 and 4 show, in vertical section on the line III—III of Fig. 2, a portion of said turret with certain of its parts in two different characteristic positions.

Figure 1:
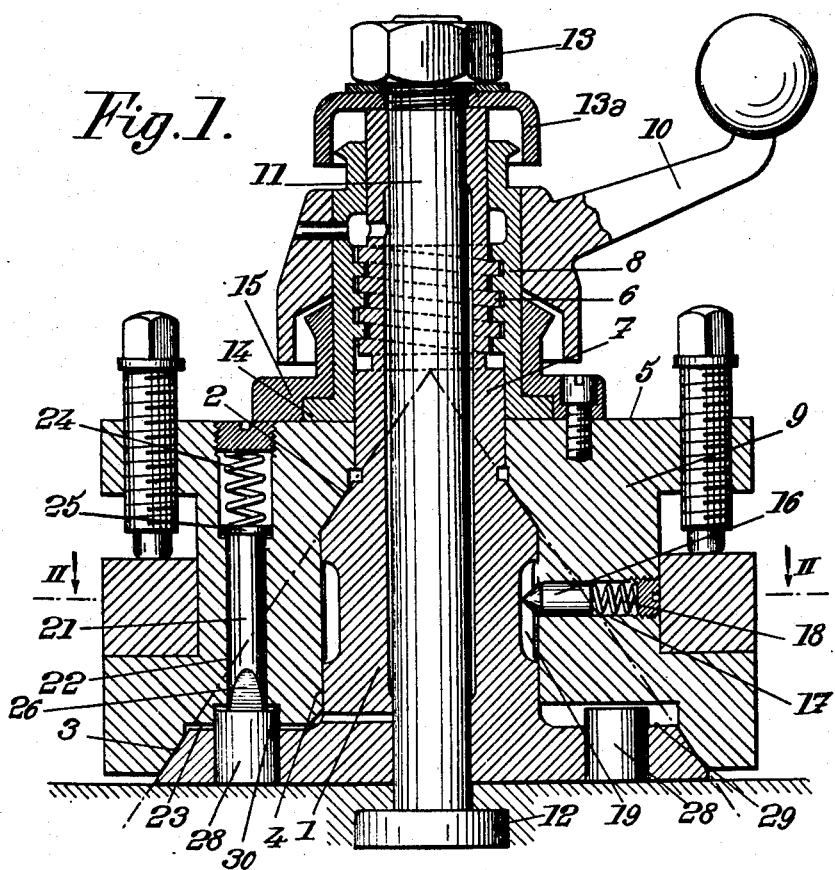

In the following description, the invention is supposed to be applied to a turret for a machine-tool, for instance a slide lathe, this turret supporting, as well known, several tools which are to be caused successively to act on the piece of work and which must, consequently, be brought successively to a place such that they can act upon the piece of work at the same point.

At a suitable point of the machine-tool in question we provide a fixed support 1 for the turret, the guiding surfaces of said support being essentially constituted by two conical annular bearing surfaces 2 and 3 connected together by a vertical cylindrical centering surface 4, which may be mounted with a very slight play, and a horizontal surface 29. The conical bearing surfaces 2 and 3 are therefore located at different levels and are preferably portions of the same cone the axis of which coincides with that of the fixed support 1 and of the cylindrical centering surface 4.

On the support thus constituted we mount the turret, designated by reference numeral 5 and arranged in any suitable manner, in particular concerning the manner of mounting and fixing the tools (not shown). This turret is adapted to be displaced axially with respect to the support through screw-threads 6 provided on a vertical cylinder 7 constituting an axial extension of the upper portion of support 1 and on which is engaged a threaded sleeve 8 rotatable with respect to the body 9 of turret 5. A handle 10, fixed to said sleeve, permits of rotating it in one direction or the other to move the turret toward or away from its conical bearings 2 and 3. The axial displacements of turret 5, when it is moved away from its supports, are limited for instance by a cup-shaped member 13a carried by a bolt 11 freely housed in an axial passage provided in fixed support 1 and sleeve 8 and the head 12 of which keeps support 1 in position after nut 13 has been tightened on the upper end of said support 1, through the intermediate of said cup-shaped member 13a. When threaded sleeve 8 is rotated about its axis, turret 5 is moved away from its support 1 and body 9 can be displaced angularly with respect to sleeve 8 since it bears freely upon a flange 14 of said sleeve through a ring 15 fixed by means of screws to said body 9.

It should be noted that the cylindrical portion 4 ensures centering of the body of turret 5 when the latter is moved away from its conical supports 2 and 3 but the said conical supports are the only elements that ensure an accurate centering of turret 5 when it occupies its active position, because these conical bearings, due to the fact that they are located at a relatively great distance from each other, give turret 5 a support without play on the conical portion of body 1, the latter penetrating as a conical wedge in its housing provided in body 9.

This coincidence of the axes does not change when the turret is brought into different angular positions with respect to its support 1, more particularly those for which the tools come successively to occupy their active position with respect to the piece of work.

In the example shown in the drawings, the turret can occupy four characteristic positions, at 90° to one another and determined by a lug 16 slidable in a radial housing 17 of the body 9 of the turret and urged toward support 1 by a spring 18. The conical point of this lug is adapted to engage one of the axial grooves or notches 19 distributed over the periphery of the cylindrical part 4 of the support. This lug 16 and each of the notches act as marking means for each characteristic angular position of the turret but do not permit of immobilizing the latter in a well determined accurate position.

In order to obtain immobilization in this position, we make use of a finger 21 engaged in a housing 22 provided in the body 9 of the turret, parallel to the axis thereof and constantly urged toward the horizontal face 23 of support 1 by a spring 24. This finger therefore tends to project from said face 23 and its axial movement, in this direction, is limited by a flange 25 bearing against an inner shoulder of housing 22.

The free end of finger 21 is provided with a plane face 26, oblique with respect to the axis of said finger. This plane face is adapted to cooperate with a plane face 27, of corresponding position and slope, provided on an abutment 28 projecting from the upper horizontal face 29 of support 1.

Projection 28 is adapted to engage in a recess 30 of corresponding shape provided in body 9, and the lateral wall of which bears against the corresponding wall of said projection 28, which is thus wedged between said lateral wall and the chamfered end of finger 21 when plane 26 slides along plane 27 or is in contact therewith, under the effect of the thrust of spring 24.

Figure 3:
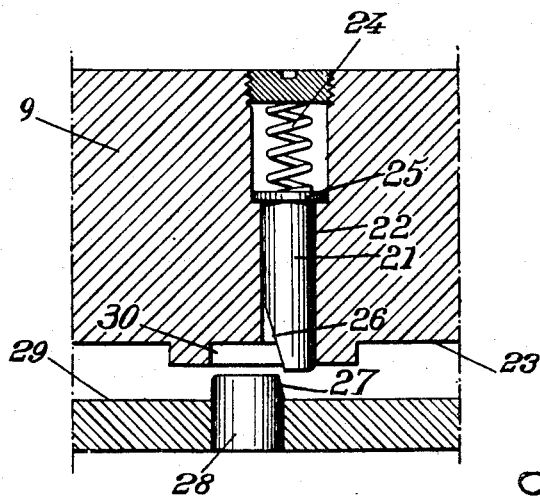

When turret 5 has been moved away from support 1 by means of handle 10 and has been turned to bring it into any of its characteristic positions, for instance that shown by the drawing, the free end of finger 21 is at such a distance from projections 28 that it can pass freely above them and does not interfere with the rotation of the turret. When the angular position has been fixed by the engagement of lug 16 in notch 19, finger 21 is located opposite abutment 28 and the plane faces 26 and 27 are parallel to each other (Fig. 3).

When turret 8 is moved toward its support 1, through handle 10, a time comes when plane face 26 is brought into contact with plane face 27 with a sliding displacement thereon. In this way, it can, if necessary, correct the angular position of the turret before the latter is fully immobilized by contact with its conical supports 2 and 3. At this time, the projection 28 is engaged without play against the bore of notch 30, being tightly held between the lateral wall thereof and the free end of finger 21 (Fig. 4) which bears, on the opposite side, against the wall of its cylindrical housing.

When turret 5 is again moved away from its support 1, finger 21 is moved upwardly by its collar 25 and plane face 26 is automatically moved away from plane face 27 whereby projection 28 is withdrawn from notch 30 and permits angular movement of the turret in one direction or the other.

An analogous result would be obtained by fitting elastic and sliding finger 21 at a suitable point of fixed support 1 and projection or projections 28 at corresponding places of the body 9 of the turret.

The device according to our invention might be utilized with the same effects and advantages with turrets for machine-tools, other than tool carrying turrets in particular with spindle holding turrets or work holding turrets.

As a matter of fact, the device may be utilized, in a general manner, whether the relative movement of one piece with respect to the other is an angular or a rectilinear movement and whatever be the centering or guiding means provided for this relative movement.

Among other interesting applications of our invention we may cite plates and tables having a rotary or rectilinear movement by means of which parts or pieces of works are fed to various tools or apparatus, provided at different stations where these plates or tables may be stopped, for undergoing at these stations distinct treatments or operations (cutting of diamonds, distribution of colors on keramic plates in course of manufacture, etc.). Likewise it may be applied to certain sighting instruments, with one or several fixed marking means, etc.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the accompanying claims.

What we claim is:

1. Apparatus comprising two elements rotatable with respect to each other about an axis and slidable with respect to each other in the direction of that axis, in combination with locking means constituting the sole means for immobilizing rotation of said elements with respect to each other, said locking means comprising a recess in one element adjacent the other of said elements forming a wall parallel to said axis, a bore entering said recess and spaced from but parallel to said wall, an abutment on said other element projecting therefrom toward said one element for entering the recess in said other element during said slidable movement, said abutment having at its outer end a chamfered plane face, a finger slidably mounted in the bore of said one element, and resilient means urging one end of said finger into the recess in said one element, said finger having a chamfered plane face at the end thereof which projects into the recess of said one element, whereby the chamfered face of said abutment is engaged by the chamfered face of said finger as said elements are slidably brought together to wedge said abutment between said finger and the said wall of said recess in said one element to immobilize relative rotation of said elements in either direction.

2. Apparatus comprising two elements rotatable with respect to each other about an axis and slidable with respect to each other in the direction of that axis, in combination with locking means constituting the sole means for immobilizing rotation of said elements with respect to each other, said locking means comprising a recess in one element adjacent the other of said elements forming a wall parallel to said axis, a bore entering said recess and spaced from but parallel to said wall, an abutment on said other element projecting therefrom toward said one element for entering the recess in said other element during said slidable movement, said abutment having at its outer end a chamfered plane face, a finger slidably mounted in the bore of said one element, and a spring urging one end of said finger into the recess in said one element, said finger having a chamfered plane face at the end thereof which projects into the recess of said one element, whereby the chamfered face of said abutment is engaged by the chamfered face of said finger as said elements are slidably brought together to wedge said abutment between said finger and the said wall of said recess in said one element to immobilize relative rotation of said elements in either direction.

HENRI RENÉ BRUET.
THEODORE LAFITTE.

REFERENCES CITED

The following references are of record in the file of this patent:

UNITED STATES PATENTS

| Number | Name | Date |
| --- | --- | --- |
| 1,061,822 | Craig | May 13, 1913 |
| 1,236,200 | Miller | Aug. 7, 1917 |